Patented May 24, 1938

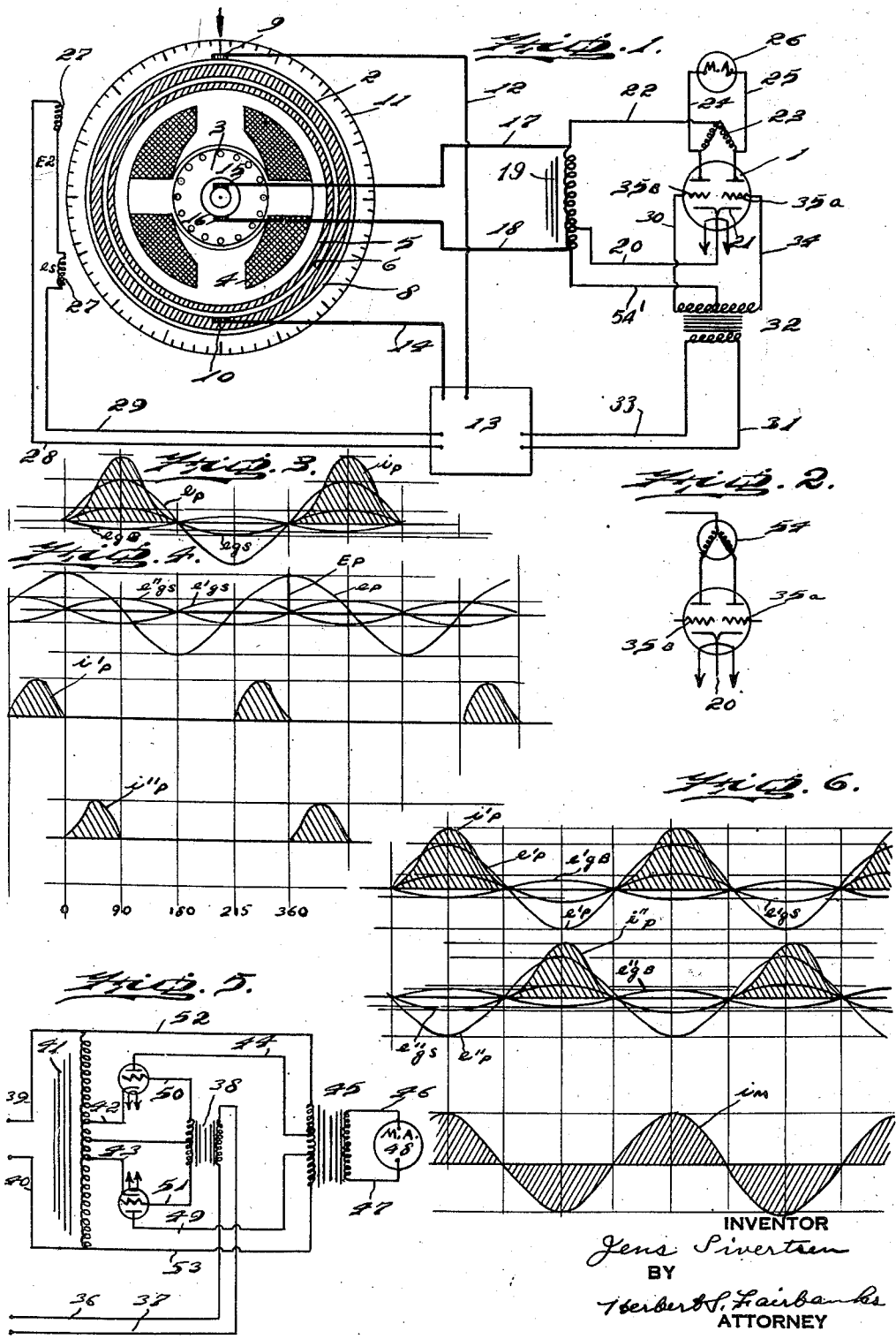
May 24, 1938.  J. SIVERTSEN  2,118,770
METHOD OF AND APPARATUS FOR DETERMINING UNBALANCE IN ROTATABLE BODIES
Filed Nov. 5, 1934

2,118,770

UNITED STATES PATENT OFFICE 2,118,770

METHOD OF AND APPARATUS FOR DETERMINING UNBALANCE IN ROTATABLE BODIES

Jens Sivertsen, Philadelphia, Pa., assignor to Tinius Olsen Testing Machine Company, Philadelphia, Pa., a corporation of Pennsylvania Application November 5, 1934, Serial No. 751,667

12 Claims. (Cl. 73—51)

It is common knowledge that a vacuum tube only will pass current in a certain instance from plate to cathode when the plate has a positive voltage relative to the cathode.

It is not certain that the tube will pass current even when the plate is positive as this depends on the instantaneous grid voltage.

The value of this current depends also on the grid voltage.

But it can be repeated that the plate voltage must be positive. This condition must always exist when current is flowing.

This method is founded on this idea. We can with any suitable meter arrangement in the plate circuit of the tube obtain an indication of the integral value of the plate current, either the average value or effective value, depending on meter used.

By supplying an A. C. voltage to the plate, the plate will during a time corresponding to 180 electrical degrees be positive, and during 180 electrical degrees be negative.

This plate voltage has a constant amplitude.

If we now apply to the grid of the same tube an A. C. voltage of the same frequency during an infinitesimal time interval, one of four conditions may exist.

1. With the plate negative and the grid negative, the tube does not pass current.
2. With the plate positive and the grid negative, the tube does not pass current.
3. With the plate negative and the grid positive, the tube does not pass current.
4. With the plate positive and the grid positive, the tube passes current.

We thus see that out of four possible conditions, only the fourth satisfies to pass current.

What I have said is not entirely correct. A modern vacuum tube will pass current even with a negative grid, but if we arrange a circuit in such a manner that we have an automatic negative bias on the tube which will make the current zero when the plate voltage is positive and we have no signal voltage, we can still look at the arrangement as set forth.

If $e_p$=instantaneous plate voltage
$e_g$=instantaneous grid voltage
$e_{gb}+e_{gs}=e_g$
where $e_{gb}$=instantaneous grid bias
$e_{gs}$=instantaneous signal voltage, in our case due to unbalance.

$i_p$=instantaneous plate current.
$u$=amplification factor of tube.
$R$=tube impedance, plus load impedance $$i_p = \frac{(e_p + ue_g)^p}{R}$$

when $e_p$ is positive, when $e_p$ is not positive we get no current
when $$e_g = e_{gb} + e_{gs}, \quad i_p = \frac{(e_p + ue_{gb} + u.e_{gs})^p}{R}$$

If we make $$e_{gb} = -\frac{1}{u}e_p$$

i. e. minus plate voltage divided by amplification factor, we get $$i_p = \frac{\left(e_p - \frac{u}{u}e_p + ue_{gs}\right)^p}{R}$$

as the bias is negative.
The plate current will therefore be $$i_p = \frac{(u.e_{gs})^p}{R}$$

when $e_p$ is positive, and if $p=1$ $$i_p = \frac{ue_{gs}}{R}$$

only depending on $e_{gs}$ (the signal voltage in value) and linear to the same degree as $p$ is equal to unity.

This however, as we know is only true as long as the plate voltage is positive.

The reading we get in our meter will be, if this is a D'Arsonwal instrument, a linear integrating instrument, the average current through the meter $Ip$.

If we assume that at a time and an angle zero our plate becomes positive.

At a time $t_1$ and angular position $\omega t_1$ (omega $t_1$) $=\phi_1$ (phi$_1$), the grid becomes positive.

At a time $t_2$ and angle $\omega t_2 = \phi_2 = 180$ (omega $t_2$ phi$_2$), the plate becomes negative, if we assume $\phi<180$ (phi less than 180°).

$$i_p = \int_{\phi=0}^{\phi=180} \frac{ue_{gs}}{R2\pi}d\phi$$

as an average value of the plate current during one period. $e_{gs}=E_{gs}$ sine $\omega t$, where $E_{gs}$ is the amplitude (maximum instantaneous value).

We thus see that we obtain the maximum value of the integral when $\phi_1=0$, i. e. the plate and the grid signal voltages become positive at the same time. This means that, if we have an indicating meter, and means to change the phase relationship between these voltages, we can turn one of them so this phase difference becomes zero.

By means commonly known in the art, a reference point is selected for the signal voltage i. e. unbalance, and a graduated dial together with a pointer will give a reference point and means to measure the angle difference between the signal voltage and the plate voltage, also called generator voltage.

The rotating parts of generator and the unbalanced body which are mechanically coupled together, will rotate with the same speed and create A. C. voltage of same frequency.

The field of the generator with the dial can be turned to different angle positions. When a reference point on the dial is selected, we see that 180 mechanical degrees on the dial corresponds to 180 electrical degrees in the A. C. output of the generator.

The method as here explained contains the elementary fundamentals. The system can be used both with A. C. and D. C. meters, and can be used to find the angle utilizing different refinements.

An object of the invention is to devise a novel method of and apparatus for determining angle and amount of unbalance in systems where the unbalance through a pick up arrangement in ways already known generates an A. C. voltage. The balancing machine of any desired or conventional type is arranged to generate a second A. C. voltage, in addition to the A. C. voltage generated by the unbalance, which is constant as to value but can be changed at will as to phase relation relative to the other A. C. voltage.

The meter used for indicating the unbalance can be A. C. or D. C. depending on the circuit arrangement employed.

With the above and other objects in view as will hereinafter clearly appear, my invention comprehends a novel method of and apparatus for determining the unbalance of rotatable bodies.

Other novel features of construction and advantage will hereinafter more clearly appear in the detailed description and the appended claims.

For the purpose of illustrating the invention, I have shown in the accompanying drawing typical embodiments of it, which, in practice, will give reliable and satisfactory results. It is, however, to be understood that these embodiments are typical only and that the various instrumentalities of which my invention consists can be variously arranged and organized, and the invention is not limited to the precise arrangement and organization of these instrumentalities as herein set forth.

Figure 1 is a wiring diagram in which a D. C. meter is used as an indicator.

Figure 2 is a view of a differential meter which can be employed instead of the impedance arrangement shown in Figure 1.

Figure 3 is a diagram showing the different voltages and the plate current in one tube, when the signal voltage and the plate voltage are in phase.

Figure 4 is a current and voltage diagram corresponding to the wiring diagram in Fig. 1 showing $e_p$, $e_{gs}$, $i_p$ under the assumption that the signal grid voltage in one tube is 90° ahead of plate voltage in phase and the other 90° behind.

Figure 5 is a wiring diagram for A. C. meter readings.

Figure 6 is a diagram showing the currents from Figure 5.

Similar numerals indicate corresponding parts.
Referring to the drawing:—

It will be understood from the statement of the invention that two voltages are generated by the balancing machine, and these voltages may be of the same frequency or one of them can be of a frequency which is a multiple of 2 relatively to the other as for example $F_1=2F_2$; $F_1=2\times 2F_2$ etc. The lower frequency can then through a frequency doubler arrangement be made equal to the other before the two voltages are finally brought together in the vacuum tube.

There is a special advantage in this since if the balancing machine was designed for a very low R. P. M. one is not limited to this in the generator arrangement shown, otherwise it might be difficult with a generator which is small physically to obtain the necessary voltage and watts.

The generator stator field is mechanically coupled to a dial turnable to different positions. The field is also turned to a new position when the dial is turned to a new position, thereby changing the phase of the generator voltage relatively to the signal grid voltage. The freedom of the dial and generator stator must be sufficient to permit a turning of at least 180° or 360 electrical degrees, depending on whether or not a meter with its zero point in the middle of its reading is used.

When these two voltages are brought together in a vacuum tube, the plate current of the vacuum tube will be maximum when they are in phase and minimum when they are 180° out of phase.

In both Figure 1 and Figure 5, the generator voltage is used as plate voltage on the tube. Part of the generator voltage is through an A. C. voltage divider taken off to give an A. C. bias on the tube. This bias is independent of the current through the tube and only depends on the once fixed setting.

Referring now more particularly to Figure 1, I have shown in this figure a wiring diagram utilizing a balanced impedance network to balance two tubes, using two halves of a double vacuum tube 1. The tubes have the same plate voltage, while the signal grid volt designated as $e_{gs}$ is 180° different in the tubes. The network is balanced to take care of minor differences in the tubes and gives zero current through the meter at zero signal voltage. In this method the plate current for each tube separately with no signal voltage does not have to be adjusted to zero. This is an advantage as the calibration curve can be made more straight lined.

When signal voltage is supplied to the tube, it will be more in phase with the plate voltage in one tube than in the other. The voltage drop in the resistors 23 will be different as to integral value and a current will pass through the meter. By turning the plate voltage to such a position that one grid will be 90° ahead and the other grid 90° behind in phase a zero reading is shown on the meter.

This method assumes that the plate voltage curve is symmetrical around its Y axis. This, however, is not essential, since a minor defect in the symmetry will not cause any error as long as it is constant because the balancing machine has a defined zero position, and when this is once determined the possible unsymmetry may be taken into account.

This zero method gives a very accurate method to determine the angle. By selecting the right voltages, tubes and meter and a proper design of the different parts a determination of the angle can be obtained as close as the actual speed of the unbalanced rotating body in the pick-up plane and therefore the signal voltage is a true sine wave not too influenced by erratic mechanical conditions.

With the foregoing in view, a detailed description of the drawing will be clear to those skilled in this art. The generator 2 has its rotor or armature 3 mechanically coupled with the balancing machine on which the rotatable body to be tested is mounted, so that the rotor is driven at a fixed speed relatively to the speed of rotation of said body. The stator 4 of the generator has its field windings surrounded by an insulator ring 5, surrounded by two slip rings 6 and 8. A brush 9 contacts with the slip ring 8 and a brush 10 contacts with the slip ring 6. These brushes 9 and 10 are fixedly mounted on the balancing machine. Thru the brushes 9 and 10 we supply D. C. current to the field of the generator. This D. C. supply can be arranged in connection with the power pack of the amplifier unit. If permanent magnets are used instead of electromagnets the field coil, brushes 9 and 10 and D. C. supply are omitted.

The A. C. output from the generator is taken by brushes 15 and 16 and lines 17 and 18 to an automatic grid biasing impedance 19 which has a small D. C. impedance but a large A. C. impedance. A line 20 leads from the impedance 19 to the cathode 21 of the tubes, and a line 22 leads through a balancing impedance 23 to the two plates of the double vacuum tube. The balancing impedance 23 is connected by lines 24 and 25 with the meter 26. The pick up coils 27 are connected by lines 28 and 29 with the amplifier 13, which latter is connected by lines 33, and 31 with the transformer 32. The transformer 32 is connected by lines 30 and 34 with the grids 35a and 35b. The impedance 19 is connected by line 54' with the transformer 32.

Referring now to the diagram shown in Figure 3, $i_p$ is the plate current, $e_p$ the plate voltage, $e_{gs}$ the grid voltage from the signal voltage E2, and $e_{gb}$ the automatic grid bias voltage. These voltages are in the diagram shown for the case in which the dial is turned so the signal and generator voltages are in phase.

In the diagram shown in Figure 4 $i'_p$ is the plate current of one tube of the double vacuum tube and $i''_p$ is the plate current of the other tube of the double vacuum tube shown in Figure 1. In Figure 4, $e''_{gs}$ is the signal voltage for tube 2; $e'_{gs}$ is the signal voltage for tube 1; $E_p$ is the maximum voltage; $e_p$ is the plate voltage.

In Figure 5, I have shown a wiring diagram for use with an A. C. meter. In Figure 2, I show a meter arrangement which can be substituted for the meter and resistors in Figure 1. Instead of resistors 23 in Figure 1, a differential meter 54 is used instead of the meter 26.

The signal voltage created by unbalanced forces in the test body passes by lines 36 and 37 to the input of transformer 38. The A. C. output from the generator passes by lines 39 and 40 to the A. C. grid biasing impedance 41 which is connected by line 42 with the cathode of one tube and by line 43 with the cathode of the other tube. The plate of the first tube is connected by line 44 with one half of the primary of an output transformer 45, the secondary of which is connected by lines 46 and 47 with an A. C. meter 48. The second tube has its plate connected by line 49 with the other half of the primary of the transformer 45. The grid of the first tube is connected by line 50 with one half of the secondary of the transformer 38 and the grid of the second tube is connected by line 51 with the other half of the secondary of the transformer 38, and the middle point goes to the middle point of the impedance 41. The impedance 41 is connected by lines 52 and 53 with the primary of the transformer 45. The voltage and current curves for the wiring diagram seen in Figure 5 are shown in Figure 6 wherein $i'_p$ is the plate current of the first tube, $e'_p$ the plate voltage of the first tube, $e'_{gb}$ the grid bias voltage for the first tube, $e'_{gs}$ the signal voltage for the first tube. For the second tube $i''_p$ is the plate current, $e''_p$ the plate voltage, and $e''_{gb}$ the grid bias voltage, and $e''_{gs}$ the signal voltage. The meter current is $i_m$. The current and voltage curves in Figure 6 show conditions when plate voltage is tuned in phase with grid signal voltage. This method shown in Figures 5 and 6 allows only for tuning to maximum. By switching either one grid or one plate voltage to the opposite side, i. e., 180°, zero tuning is obtained.

If the pick-up coils give a voltage stepped up high enough through a transformer, the amplifier may be omitted as the small current delivered is almost zero with the correct selection of tube. The pick-up will therefore never act as a brake on the vibratory movements of the rotating body. It will clearly appear from the wiring diagrams and current and voltage diagrams that the grid bias voltage is always 180° out of phase with the plate voltage as shown in the equation $$i_p = \frac{\left(e_p - \frac{u}{u}e_p + u.e_{gs}\right)^p}{R} = \frac{(u.e_{gs})^p}{R} - \frac{u}{u}e_p$$

shows this clearly.

I have shown in the diagrams the signal voltage on the grid of the tube and the generator voltage on the plate, but I do not desire to be limited to this arrangement. With modern vacuum tubes, having a number of elements, the same effect obtained here with triodes, can be obtained with different combinations. Effects more distinct than here outlined, can be obtained and also less distinct.

In the diagrams, the tuning is to zero to obtain the right angle location by a differential method where the grid voltages of both tubes are 90° out of phase with the plate voltage. In some cases it is desirable to tune to maximum in order to determine the angle instead of to a differential zero. The point determination will then not be so sharp as when we turn to zero. In order to improve this, the plate voltage generator in one hook up was so designed that it did not give a sine wave but a very distorted wave form with a pronounced peak. This improved the peak tuning as to accuracy. In another case, in one tube, the signal voltage was mixed with the generator voltage and the output of this tube had a very pronounced peak containing a good second harmonic. This output was put on the grid of the second tube with the generator voltage being plate voltage. This gave a very pronounced peak and therefore sharper tuning than the ordinary sine waves.

It will now be apparent that in accordance with this invention, an A. C. voltage is generated by the unbalanced forces in the unbalanced rotatable body being tested. A second A. C. voltage is generated which is constant as to value but can be changed as to phase location relative to the first voltage, and these two voltages are passed to a vacuum tube and the readings indicative of the magnitude of the unbalanced forces of the body being tested are indicated by the position of the pointer relatively to the graduated scale of the meter. By turning the dial 11 a mechanical angle $\alpha$ the field of the generator is turned the same mechanical angle $\alpha$ which will turn the plate voltage vector $E_p$ an electrical angle $\alpha$ in the current diagram, and a reading is obtained which bears a definite relationship with the angular position of unbalanced forces about the pivot axis of vibration. The pointer of the dial will now read on the angle of unbalance. If the dial has been tuned to cause both the two grid voltages to be 90° out of phase the minimum reading or zero reading is obtained. This gives an accurate determination of the angle of unbalance to a fraction of one degree.

The radio parts used are standard, and the plate voltage generator can be made from an ordinary motor with minor changes.

There is also a direct angle reading method whereby the general properties of my method can be utilized.

Assume that I have the circuit arrangement shown in Figure 1, or some other arrangement with the same properties.

Assume that the plate voltage generator can not be turned, the instantaneous current is $$i_{pm} = \frac{u e_{gs}}{R}$$

when properly biased.

The instantaneous value of current in tube 1 is $$i_{pm} = \frac{u e_{gs}}{R}$$

The phase difference between signal voltage and plate voltage is $\alpha$.

$E_{gs}$ = amplitude value of signal voltage,
$I_{pm}$ = amplitude value of plate current, $$i_{pm} = \frac{u \cdot e_{gs}}{R}$$

Instantaneous value of current is $i_{pm} = I_{pm}$. sine $\omega t$ or if $\omega t$ is called $\phi$ $$i_{pm} = I_{pm} \sin \phi$$

The average current is $$i_p = \int_{\phi=0}^{\phi=2\pi} \frac{I_{pm} \text{ sine } \phi}{2\pi} d\phi$$

The value of the instantaneous value is zero from $\phi=\alpha$ to $\phi=2\pi$ we get $$i_p = \frac{I_{pm}}{2\pi} \int_{\phi=0}^{\phi=\alpha} \text{sine } \phi d\phi = \frac{I_{pm}}{2\pi}[\text{cosine } \alpha - \text{cosine } 0]$$

as the integral of sine is cosine. The average current is therefore $$+ \frac{I_{pm}}{2\pi}[1 - \text{cosine } \alpha]$$

if we change the sign from (—) to (+).
If we call the constant $$\frac{I_{pm}}{2\pi} \text{ for } K$$

we get for the average current thru tube 1:

$$i'_p = K[1 - \text{cosine } \alpha]$$

the current thru tube 2 is $$i''_p = K \cdot \text{cosine } \alpha$$

If we therefore, with our volume control, adjust the total current to a predetermined mark on the milliammeter, equals constant equals 2, a meter in the plate circuit of only one of the tubes will show cos $\alpha$, and by using a cosine scale will show the angle directly. For angles greater than 30° this will be fairly accurate. For angles smaller than 30° approximately where cosine is great, this is not so accurate. To get an accurate reading, we will take the difference.

$$1 - \cos \alpha$$

$$\frac{-(+\cos) \alpha}{1 - 2 \cos \alpha}$$

This means placing a meter in a differential just as Figure 1 shows, or using a differential meter like Figure 2.

To find the amount of unbalance, the volume control is set back to its standard position, and the meter showing the total current will now tell the amount of unbalance. A similar scheme can be applied, utilizing thyratrons instead of vacuum tubes.

The mechanism for generating the signal A. C. voltage from the unbalanced forces in the rotatable body may be similar to the solenoid coils and permanent magnet shown in the application of B. E. Ohlson, Serial No. 666,085. The magnitude of this signal voltage is in proportion to the amplitude of vibration of the revolving body and its phase relation is dependent upon the angular location of the unbalance.

When referring in the claims to the grid and plate voltages the cathode is the reference point, and it should not be construed that voltages are impressed on the cathode, as a voltage impressed on the cathode will change the grid voltage which latter is defined as the voltage between the cathode and the grid.

Having thus described my invention what I claim as new and desire to secure by Letters Patent is:—

1. The method of determining the unbalance of a rotatable body, which consists in generating two A. C. voltages of the same frequency, one voltage being derived from the unbalanced forces in said body, impressing said one voltage on a grid of a thermionic valve and impressing the second voltage on the plate and a smaller amount of the second voltage on a grid but with 180° phase difference, measuring the D. C. current in said plate circuit which is a function of the first A. C. voltage and its phase relation to the second A. C. voltage to determine the angle and amount of unbalance in the rotatable body.

2. The method of determining the unbalance of a rotatable body, which consists in generating two A. C. voltages of the same frequency, one voltage being derived from the unbalanced forces in said body, impressing said one voltage on the grid of a vacuum tube and impressing the second voltage on the plate and a smaller amount of the second voltage on the grid but with 180° phase difference, varying the phase angle between the two voltages, measuring the D. C. current in said plate circuit which is a function of the first A. C. voltage and its phase relation to the second A. C. voltage to determine the angle and amount of unbalance in the rotatable body.

3. The method of determining the unbalance of a rotatable body, which consists in generating two A. C. voltages of the same frequency, one voltage being derived from the unbalanced forces in said body, impressing said one voltage on the grids of two vacuum tubes but with 180° phase difference, impressing the second voltage on the plates of said tubes and part of it on the grids of said tubes but with 180° phase difference from the plates, and measuring the difference between the currents in said tubes in order to determine the angular position of the unbalance.

4. The method of determining the unbalance of a rotatable body, which consists in generating two A. C. voltages of the same frequency, one voltage being derived from the unbalanced forces in said body, impressing said one voltage on the grids of two vacuum tubes but with 180° phase difference, impressing the second voltage on the plates of said tubes and part of it on the grids of said tubes but with 180° phase difference from the plates, varying the phase relation between the first and second A. C. voltages, and measuring the difference between the currents in said tubes in order to determine the angular position of the unbalance.

5. An apparatus to determine the unbalance of a rotatable body consisting of means to generate an A. C. voltage by the action of the unbalanced forces in the body, a vacuum tube, means to supply said voltage to a grid of said vacuum tube, means to generate a second A. C. voltage of the same frequency as the first A. C. voltage, means to supply a part of this second voltage to the plate of said vacuum tube and a smaller part with 180° phase difference to a grid of the tube, and means to measure the plate current at said vacuum tube which is indicative of the angular position and the amount of unbalance in said body.

6. An apparatus to determine the unbalance of a rotatable body consisting of means to generate an A. C. voltage by the action of the unbalanced forces in the body, a vacuum tube, means to supply said voltage to the grid of said vacuum tube, means to generate a second A. C. voltage of the same frequency as the first A. C. voltage, means to supply a part of this second voltage to the plate of said vacuum tube and a smaller part with 180° phase difference to the grid of the tube, means to vary the phase relation of said two A. C. voltages, and means to measure the plate current at said vacuum tube which is indicative of the angular position and the amount of unbalance in said body.

7. An apparatus to determine the unbalance of a rotatable body consisting of means to generate an A. C. voltage by the action of the unbalanced forces in the body, two vacuum tubes, means to supply said voltage to the grids of said vacuum tubes, but with 180° phase differences in the two tubes, means to generate a second A. C. voltage of the same frequency as the first A. C. voltage, means to supply part of said second voltage to the plates of said tubes and a smaller part to the grids of the tubes with 180° phase difference from the plate voltage, and a meter measuring the difference of current in the plates of said vacuum tubes indicative of the angular position of the unbalance.

8. An apparatus to determine the unbalance of a rotatable body consisting of means to generate an A. C. voltage by the action of the unbalanced forces in the body, two thermionic valves, means to supply said voltage to the grids of said thermionic valves, but with 180° phase differences in the two valves, means to generate a second A. C. voltage of the same frequency as the first A. C. voltage, means to supply part of said second voltage to the plates of said valves and a smaller part to the grids of the valves with 180° phase difference from the plate voltage, and means to vary the phase relation between said two A. C. voltages in order to determine the angular position and amount of unbalance in said body.

9. An apparatus to determine the unbalance of a rotatable body consisting of means to generate an A. C. voltage by the action of the unbalanced forces in the body, a thermionic valve, means to supply said voltage to a grid of said thermionic valve, means to generate a second A. C. voltage of the same frequency as the first A. C. voltage, means to supply part of said second voltage to a plate of said thermionic valve, and a smaller part of said second A. C. voltage to a grid of said thermionic valve, but with 180° phase difference from the plate voltage, a meter in the plate circuit of said thermionic valve, the current through which will be indicative of the amount and angular position of the unbalance.

10. The method of determining the unbalance of a rotatable body, which consists in generating two A. C. voltages of the same frequency, one voltage being derived from the unbalanced forces in said body, impressing said one voltage on the grid of a thermionic valve and impressing the second voltage on the plate and a smaller amount of the second voltage on the grid but with 180° phase difference, measuring the D. C. current in said plate circuit which is a function of the first A. C. voltage and its phase relation to the second A. C. voltage to determine the angle and amount of unbalance in the rotatable body.

11. An apparatus to determine the unbalance of a rotatable body consisting of means to generate an A. C. voltage by the action of the unbalanced forces in the body, two thermionic valves, means to supply said one voltage to the grids of said valves, but with 180° phase differences in the two valves, means to generate a second A. C. voltage of the same frequency as the first A. C. voltage, means to supply part of said second voltage to the plates of said valves and a smaller part to the grids of the valves with 180° phase difference from the plate voltage, and means to vary the phase relation between said two A. C. voltages in order to determine the angular position and amount of unbalance in said body.

12. An apparatus to determine the unbalance of a rotatable body consisting of means to generate an A. C. voltage by the action of the unbalanced forces in the body, a thermionic valve, means to supply said voltage to a grid of said valve, means to generate a second A. C. voltage of the same frequency as the first A. C. voltage, means to supply part of said second voltage to a plate of said valve, and a smaller part of said second A. C. voltage to a grid of said valve, but with 180° phase difference from the plate voltage, a meter in the plate circuit of said valve, the current through which will be indicative of the amount and angular position of the unbalance.

JENS SIVERTSEN.